(12) United States Patent
Farquhar

(10) Patent No.: US 9,177,123 B1
(45) Date of Patent: Nov. 3, 2015

(54) DETECTING ILLEGITIMATE CODE GENERATORS

(71) Applicant: EMC Corporation, Hopkinton, MA (US)

(72) Inventor: Ian B. Farquhar, Glenwood (AU)

(73) Assignee: EMC Corporation, Hopkinton, MA (US)

( * ) Notice: Subject to any disclaimer, the term of this patent is extended or adjusted under 35 U.S.C. 154(b) by 62 days.

(21) Appl. No.: 14/039,267

(22) Filed: Sep. 27, 2013

(51) Int. Cl.
*H04L 29/06* (2006.01)
*G06F 21/10* (2013.01)
*G06F 21/12* (2013.01)

(52) U.S. Cl.
CPC ............... *G06F 21/10* (2013.01); *G06F 21/12* (2013.01)

(58) Field of Classification Search
CPC ................................. G06F 21/10; G06F 21/12
USPC .................................................. 726/1, 16, 27
See application file for complete search history.

(56) References Cited

U.S. PATENT DOCUMENTS

| | | | | |
|---|---|---|---|---|
| 5,499,365 | A * | 3/1996 | Anderson et al. ............. | 717/122 |
| 6,279,003 | B1 * | 8/2001 | Lee et al. ...................... | 707/696 |
| 6,757,893 | B1 * | 6/2004 | Haikin .......................... | 717/170 |
| 6,802,454 | B1 * | 10/2004 | McMurtry et al. ............ | 235/494 |
| 7,756,272 | B2 * | 7/2010 | Kocher et al. ................. | 380/202 |
| 8,276,121 | B2 * | 9/2012 | Miller et al. .................. | 717/122 |
| 8,290,918 | B1 * | 10/2012 | Ioffe ............................. | 707/698 |
| 8,468,351 | B2 * | 6/2013 | Boesgaard Sorensen .... | 713/170 |
| 8,479,161 | B2 * | 7/2013 | Weigert ......................... | 717/124 |
| 8,656,380 | B1 * | 2/2014 | Ásgeirsson et al. .......... | 717/158 |
| 8,812,858 | B2 * | 8/2014 | Schneider ..................... | 713/181 |
| 8,843,512 | B2 * | 9/2014 | Thirumal ...................... | 707/769 |
| 2002/0071477 | A1 * | 6/2002 | Orava ............................ | 375/132 |
| 2003/0059050 | A1 * | 3/2003 | Hohberger et al. ........... | 380/270 |
| 2004/0111613 | A1 * | 6/2004 | Shen-Orr et al. ............. | 713/165 |
| 2004/0210885 | A1 * | 10/2004 | Wang et al. ................... | 717/158 |
| 2006/0120319 | A1 * | 6/2006 | Omori et al. .................. | 370/328 |
| 2006/0245588 | A1 * | 11/2006 | Hatakeyama ................... | 380/37 |
| 2007/0050713 | A1 * | 3/2007 | Yoshioka et al. ............. | 715/530 |
| 2007/0073985 | A1 * | 3/2007 | Wilkes .......................... | 711/161 |

(Continued)

OTHER PUBLICATIONS

Palix et al.,Tracking Code Patterns over Multiple Software Versions with Herodotos, ACM, 2010.*

(Continued)

*Primary Examiner* — David García Cervetti
(74) *Attorney, Agent, or Firm* — Ryan, Mason & Lewis, LLP

(57) ABSTRACT

Methods, apparatus and articles of manufacture for detecting illegitimate code generators are provided herein. A method includes generating a set of multiple verification algorithms; generating multiple versions of an authentication code associated with a protected resource, wherein each of the multiple versions of the authentication code satisfies all of the multiple verification algorithms; providing a first version of the authentication code from the multiple versions of the authentication code to a recipient, wherein the first version of the authentication code includes a first verification algorithm from the set of multiple verification algorithms; and providing a second version of the authentication code from the multiple versions of the authentication code to the recipient, wherein the second version of the authentication code includes (i) the first verification algorithm from the set of multiple verification algorithms and (ii) a second verification algorithm from the set of multiple verification algorithms.

20 Claims, 3 Drawing Sheets

(56) References Cited

U.S. PATENT DOCUMENTS

| | | | |
|---|---|---|---|
| 2007/0088952 A1* | 4/2007 | Hewitt et al. | 713/171 |
| 2007/0168672 A1* | 7/2007 | Izu et al. | 713/176 |
| 2008/0079535 A1* | 4/2008 | Tseng et al. | 340/5.8 |
| 2008/0168433 A1* | 7/2008 | Arnold et al. | 717/158 |
| 2008/0195868 A1* | 8/2008 | Asokan et al. | 713/176 |
| 2008/0235386 A1* | 9/2008 | Oommen | 709/230 |
| 2008/0256631 A1* | 10/2008 | Zvi | 726/22 |
| 2008/0313191 A1* | 12/2008 | Bouazizi | 707/10 |
| 2009/0199069 A1* | 8/2009 | Palanki et al. | 714/755 |
| 2009/0307302 A1* | 12/2009 | Tennant et al. | 709/203 |
| 2010/0122082 A1* | 5/2010 | Deng et al. | 713/159 |
| 2010/0122330 A1* | 5/2010 | McMillan et al. | 726/6 |
| 2010/0158242 A1* | 6/2010 | Asher | 380/28 |
| 2010/0241850 A1* | 9/2010 | Xiong | 713/155 |
| 2011/0002459 A1* | 1/2011 | Kim | 380/28 |
| 2011/0113012 A1* | 5/2011 | Gruhl et al. | 707/646 |
| 2011/0150044 A1* | 6/2011 | Rousseaux et al. | 375/147 |
| 2011/0173698 A1* | 7/2011 | Polyakov et al. | 726/23 |
| 2012/0078978 A1* | 3/2012 | Shoolman et al. | 707/803 |
| 2012/0185835 A1* | 7/2012 | Klots et al. | 717/152 |
| 2012/0292388 A1* | 11/2012 | Hernandez | 235/379 |
| 2013/0042115 A1* | 2/2013 | Sweet et al. | 713/176 |
| 2014/0172800 A1* | 6/2014 | Clark | 707/638 |
| 2014/0223192 A1* | 8/2014 | Dent et al. | 713/189 |
| 2014/0237611 A1* | 8/2014 | Dent | 726/26 |
| 2015/0019852 A1* | 1/2015 | Lin et al. | 713/2 |

OTHER PUBLICATIONS

McCandless et al., Warez Wars, Wired Magazine Issue 5.4, Apr. 1997, http://www.warezfaq.com/oldfaq/wired.html.

* cited by examiner

DETECTING ILLEGITIMATE CODE GENERATORS

FIELD

The field relates generally to cryptography, and more particularly to illegitimate license code generator detection.

BACKGROUND

Authentication codes (such as, for example, license codes (also referred to herein as serial numbers), voucher numbers, etc.) are commonly used for software and hardware activation. Fundamentally, the function of such code is as an authenticator, confirming that the user who enters the code has legitimate rights of access to the protected resource. An analogous use of such code can include functionality as a confirmation code, wherein a user purchases a product or service and enters the code, which confirms the purchase and/or the authority to access the product or service in question.

By way of example, traditional software activation licenses utilize a single algorithm which verifies that the license code is in the correct format. However, attackers wishing to facilitate unauthorized software use can reverse engineer this algorithm from the hardware or software implementation which embodies the algorithm, and produce an illegitimate license code generator (also referred to colloquially and herein as a "keygen") which can produce keys that are in the correct format.

Accordingly, keygens represent a significant problem for the use of software activation codes. Multiple existing approaches attempt to target this challenge. For example, one such approach includes online verification. In this approach, the vendor keeps a database of legitimately issued serial numbers, and the number entered for authentication and/or confirmation is checked against that database. However, this approach requires connectivity, which may not be available. Scenarios wherein connectivity may be at issue might include, for example, if the given software is designed to run in an offline environment, if the given software is intended to run in secure/air-gapped environments (such as in government classified networks), and/or the item being authenticated has to be done so early in the boot process that the network stack is not yet available.

Another existing approach includes the use of blacklists of serial numbers to curb serial number sharing. However, keygens can typically produce a multiplicity of serials which will not appear on a blacklist. Other existing approaches include the use of hardware authenticators. However, hardware authenticators, colloquially referred to as "dongles," pose high costs, both directly and operationally. In addition, many users resent the inconvenience of hardware authentications for software license verification.

Additionally, another existing approach includes the use of asymmetrical cryptographic algorithms, thus separating key generation (that is, using private keys) from key verification (that is, using public keys). However, with such an approach, the size of the resultant serial number is typically 50-100 characters long or more. Users have to be able to manually type and/or enter the resultant serial number, creating practicality and ease of use issues with such larger serial numbers. Further, an attacker may respond to an asymmetrical cryptographic algorithm by using a (version-specific) software patch to remove the algorithm (a technique that is also colloquially referred to as "cracking").

Accordingly, a need exists for effectively detecting keygens.

SUMMARY

One or more illustrative embodiments of the present invention provide techniques for detecting illegitimate code generators. In accordance with an aspect of the invention, a method is provided comprising the steps of: generating a set of multiple verification algorithms; generating multiple versions of an authentication code associated with a protected resource, wherein each of the multiple versions of the authentication code satisfies all of the multiple verification algorithms; providing a first version of the authentication code from the multiple versions of the authentication code to a recipient, wherein the first version of the authentication code includes a first verification algorithm from the set of multiple verification algorithms; and providing a second version of the authentication code from the multiple versions of the authentication code to the recipient, wherein the second version of the authentication code includes (i) the first verification algorithm from the set of multiple verification algorithms and (ii) a second verification algorithm from the set of multiple verification algorithms.

In accordance with another aspect of the invention, a method is provided also comprising the steps of generating a set of multiple verification algorithms; generating multiple versions of an authentication code associated with a protected resource, wherein each of the multiple versions of the authentication code satisfies all of the multiple verification algorithms; and providing a first version of the authentication code from the multiple versions of the authentication code to a recipient, wherein the first version of the authentication code includes a first verification algorithm from the set of multiple verification algorithms. Additionally, this method additionally comprises the steps of identifying an indication of attempted unauthorized access to the protected resource in connection with the first version of the authentication code; and providing, in response to the indication of attempted unauthorized access to the protected resource, a second version of the authentication code from the multiple versions of the authentication code to the recipient, wherein the second version of the authentication code includes (i) the first verification algorithm from the set of multiple verification algorithms and (ii) a second verification algorithm from the set of multiple verification algorithms.

The security techniques of the illustrative embodiments overcome one or more of the problems associated with the conventional techniques described previously, and provide illegitimate code generator detection techniques. These and other features and advantages of the present invention will become more readily apparent from the accompanying drawings and the following detailed description.

DETAILED DESCRIPTION

Figure 1:
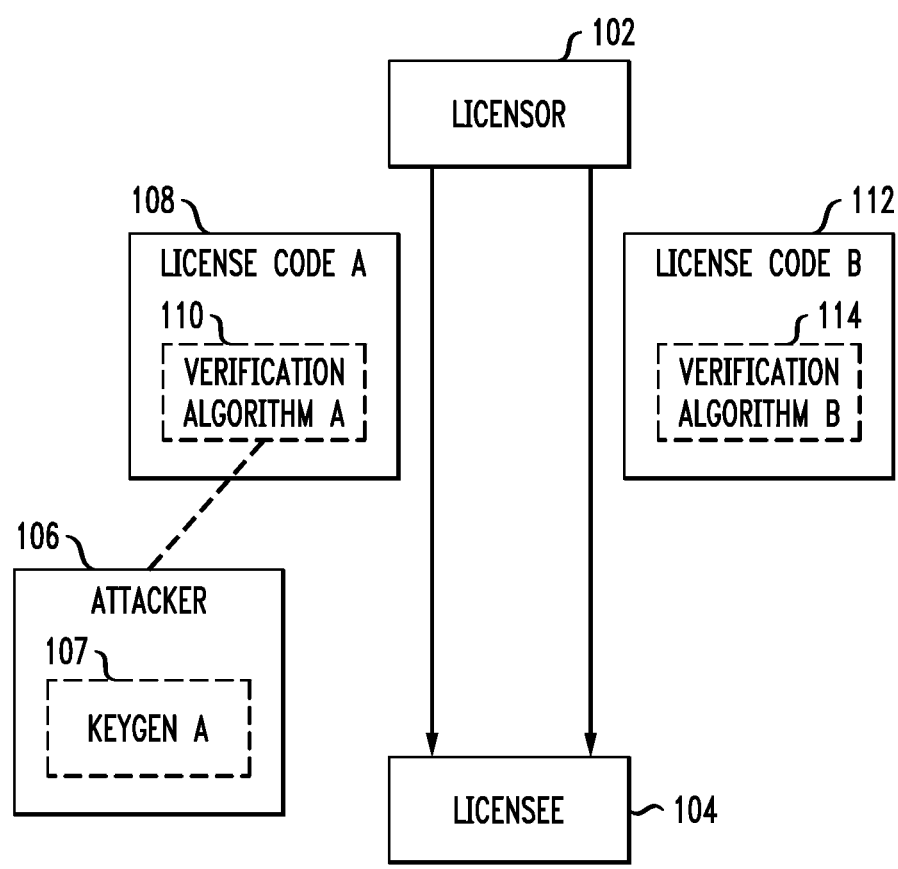
FIG. 1 is a diagram illustrating an example embodiment of the invention.

As will be described, the present invention, in one or more illustrative embodiments, provides techniques for detecting and preventing illegitimate code generators (also referred to herein as keygens) for software activation and/or additional contexts. At least one embodiment of the invention includes the utilization of multiple verification algorithms, which can be gradually and/or periodically introduced in software upgrades. Because attackers only potentially have access to code in previous versions of the given software, the keygens produced by those attackers will not anticipate the presence of the updated check, rendering the keygens unsuccessful. Legitimate code (for example, serial numbers), however, will have been generated (for example, by the software manufacturer) so that the legitimate code satisfies all criteria, both currently in use and unused or to-be-used. Therefore, the legitimate code will continue to operate correctly and successfully.

Illustrative embodiments of the present invention will be described herein with reference to exemplary communication systems and associated processing devices. It is to be appreciated, however, that the invention is not restricted to use with the particular illustrative system and device configurations shown.

Accordingly, the term communication system, as used herein, is intended to be broadly construed so as to encompass any type of system in which multiple processing devices can communicate with one another. Also, the term cryptographic or computing device, as used herein, is intended to be construed broadly so as encompass any type of processing device that incorporates cryptographic functionality (such as a computer, server, mobile telephone, radio-frequency identification (RFID) tag or reader, an Internet of Things appliance, a set-top box, authentication token, etc.). Similarly, the term "authentication server" should be understood to encompass any type of processing device or set of such devices that is operative to authenticate a passcode provided by an authentication token or other type of cryptographic device. As used herein, an authentication server need not be a network-based server, and may be implemented as a portion of a device that performs other functions, as a combination of multiple servers or other devices, or in other forms.

A computing device, in accordance with the description of one or more embodiments of the invention herein, may also be referred to herein as simply a "user." The term "user," as used in this context, should be understood to encompass, by way of example and without limitation, a user device, a process unassociated with a human, a person utilizing or otherwise associated with the device, or a combination thereof. An operation described herein as being performed by a user may therefore, for example, be performed by a user device, a person utilizing or otherwise associated with the device, or by a combination of both the person and the device.

The below description corresponds to an example embodiment of the invention implemented within the context of a software license activation use case. However, it is to be appreciated that one or more embodiments of the invention can be implemented in multiple and various additional contexts and settings (such as in connection with various other types of authentication codes).

Accordingly, at least one embodiment of the invention includes a licensor (for example, a software or hardware vendor) creating multiple structures to be embedded in license code at various times and/or in response to various activities. Further, the multiple structures can be of different types. By way merely of example, such structures can include even divisibility by a selected prime number, logical operations on bit-fields, arithmetic operations on sub-fields, etc.

At least one embodiment of the invention can also include facilitating selection of specific structures to be used by a licensor or provider. Criteria for selection can be chosen, for example, to maintain the size of the activation or license code within a certain size limitation, while ensuring compatibility between techniques as well as ensuring that the computing power needed to generate the code was within a certain limitation. Additionally, at least one embodiment of the invention includes incorporating a consideration of minimizing the ratio of valid codes to invalid codes on each single code and all code combinations, with a rationale for such a consideration relating to the interaction between multiple tests. By way merely of illustration, consider the following example scenario.

Assume that there are two tests: (1) Divisibility by a prime number (p); and (2) Bits 9, 10, 27 and 34 are all set to one. In order to generate valid codes, a user could run through a series of values m, generate a value which is m×p, and the values wherein bits 9, 10, 27 and 34 are set to one would be deemed valid. This approach is also referred to as a Monte Carlo approach. A problem present in this example scenario, however, is that test (2) has a 1 in 16 false positive rate. Accordingly, a keygen which only knows test (1) can still chance on a correct code at a rate of 1 in 16 attempts. However, test (2) is made more rigorous, a significantly increased number of values of m will be required for use to chance upon a valid key. This demonstrates an unhelpful interaction between tests which may make generation of valid codes challenging. However, having substantially different tests will make it far more challenging for an intelligent and aware attacker to spot the tests in the absence of the actual algorithm, even if the attacker had a large number of valid serial codes to analyze.

FIG. 1 is a diagram illustrating an example embodiment of the invention. By way of illustration, FIG. 1 depicts a licensor 102 (for example, a software vendor), a licensee 104 and an attacker 106. Again, it should be noted that while FIG. 1 corresponds to an example embodiment of the invention implemented within the context of a license code use case, it is to be appreciated that one or more embodiments of the invention can be implemented in connection with various other types of authentication codes.

According to the example embodiment illustrated in FIG. 1, for a first release of a software product, the licensor 102 sends a first version of license code 108 (License Code A) to the licensee 104. This first version of license code 108 (License Code A) is embedded with one verification algorithm 110 (verification algorithm A). As used herein, a verification algorithm may also be referred to as a "check," a "validation check," and/or a "structural check."

In the event that the attacker 106 attempts to utilize the software product for unauthorized use, the attacker can access the first version of license code 108 emitted from the licensor 102 and reverse engineer the corresponding verification algorithm 110 embedded in the code 108. Upon reverse engineering the corresponding verification algorithm 110, the attacker 106 can produce an illegitimate license code generator, identified in FIG. 1 as keygen A 107, which can generate codes that successfully function against only verification algorithm 110 (verification algorithm A).

At this point (that is, given simply the details described in the above two paragraphs), both the legitimate code (that is, license code 108) and any illegitimate code produced by keygen 107 would successfully activate the current version of the software product.

However, as depicted in FIG. 1, at least one embodiment of the invention includes facilitating additional action by the licensor 102. In the example embodiment illustrated in FIG. 1, the licensor 102 can, either as a part of a pre-determined release cycle or in response to intelligence indicating that a keygen was active, release a new and/or updated version of the software product. By way of example, the licensor 102 can have a team of individuals watching the web and Usenet for the appearance of keygens targeting a particular product. Accordingly, the licensor 102 sends a second version of the license code 112 (License Code B) to the licensee 104. The second version of the license code 112 would be embedded with a second verification algorithm 114 (verification algorithm B) that differed from verification algorithm 110 (verification algorithm A).

At this point (that is, subsequent to the licensor 102 sending both the first version of license code 108 and the second version of license code 112 to the licensee 104), legitimate license code 112 would be able to successfully activate the new and/or updated version of the software product, because license code 112 was created to validly pass all check criteria, which includes both verification algorithm 110 and verification algorithm 114, as well as potentially additional verification algorithms yet to be used in conjunction with the software product. Accordingly, in at least one embodiment of the invention, license code 112 is ensured to pass all check criteria (that is, verification algorithms) because all such criteria are established as a fixed set before any codes are generated by the licensor. In other words, while certain verification algorithms are yet to be used (and therefore unknown) with respect to the licensee, the licensor has (and maintains) knowledge of all verification algorithms as a fixed set. As such, it is essential that the licensor ensures that the nature of the "future" (that is, yet to be used) verification algorithms remains a closely-guarded secret.

As should also be appreciated by one skilled in the art, for purposes of clarity and simplicity, while the example embodiment depicted in FIG. 1 includes only two versions of license code (License Code A 108 and License Code B 112), one or more embodiments of the invention can include implementation within the context of additional versions of code (that is, more (for example, many more) iterations than simply the two illustrated in FIG. 1).

Referring back to FIG. 1, illegitimate keys (that is, any code produced by keygen 107) would be extremely likely to fail in attempting to activate the new and/or updated version of the software product, because code produced by keygen 107 was generated without knowledge of the added check (that is, verification algorithm 114). That is, the keygen only knows about verification A 110. Now that the software checks for verification A 110 and verification algorithm B 114, the additional check is verification algorithm B 114. As noted, while the illegitimate keys produced by keygen 107 would be extremely likely to fail in attempting to activate the new and/or updated version of the software product, there is a small chance that the keygen could accidentally generated a code which satisfies the second check (verification algorithm 114). Hence, as also noted herein, at least one embodiment of the invention includes minimizing the ratio of valid to invalid codes, thereby making such an accidental success extremely unlikely.

It is possible that the attacker 106 might respond to this new challenge by producing a new version of a keygen that incorporates the new structural check (that is, verification algorithm 114). However, the licensor can release a third version of the license code via an update (or some other mechanism as noted above), wherein the third version of the license code had embedded therein a third verification algorithm. Accordingly, the new version of a keygen that incorporates the new structural check (that is, verification algorithm 114) would fail in attempting to activate the new and/or updated version of the software product, because the code produced by the new version of a keygen was generated without knowledge of the added check (that is, the third verification algorithm). In at least one embodiment of the invention, this sequence of steps (namely, the licensor-driven steps) can be repeated as many times as desired or needed.

In existing approaches, if a code fails a verification algorithm, the failure may be because the code is invalid and the corresponding user is attempting to violate the license agreement. Alternatively, the failure may be because the user has simply entered the wrong code. In either situation, it would be difficult to determine the actual failure basis in order to potentially take action against the user. By way of example, such action might include displaying a warning, disabling the software, and/or sending a report to the software vendor.

However, the output of a validation routine implemented in an example embodiment of the invention would eliminate such ambiguity. An incorrectly entered code would likely fail all verification algorithms. If a code satisfies two verification algorithms, but not a third verification algorithm which has most recently been introduced, it can be concluded that the code derives from a keygen. On that basis (that is, that a code is derived from a keygen), corrective action can confidently be requested and/or enacted.

Additionally, as detailed herein, at least one embodiment of the invention can include implementation in offline environments requiring no Internet connection or server infrastructure to verify a license code. In such an offline context, the licensor may communicate new and/or additional versions of the code and checks to the licensee physically by provide such code on a compact disc read-only memory (CD-ROM), a universal serial bus (USB) key, a cartridge, etc. Such an embodiment might be implemented, for example, for offline authentication of vouchers.

At least one embodiment of the invention can also include implementation for hardware authentication, for example, to detect (and potentially respond to) the appearance of an invalid verification code. That is, at least one embodiment of the invention can be implemented in a context wherein a user wishes to ascertain that a piece of purchased hardware is genuine and not a well-engineered copy version that can maliciously access the user's drivers. Such an embodiment includes incorporating checking code (for example, verification algorithms) into the relevant drivers. When the device, for example, a USB key, is plugged-in, the device can carry out the check.

Additionally, at least one embodiment of the invention includes incorporation of a blacklist of known pirated serial numbers (authentication codes). Such a blacklist can be established initially by the given entity and can also be included in any updates provided thereby. The blacklist information can be derived from one or more intelligence operations that are also used to uncover keygens.

Additionally, at least one embodiment of the invention can also include implementation for inter-process communication (IPC) module authentication. Such a situation might include two modules and/or libraries in communication that need to identify each other and avoid a Trojan horse which might be masquerading as a module and/or library. In such contexts, it is common for a cookie (either a password or an authenticating token) to be exchanged between the two entities. Accordingly, at least one embodiment of the invention can include implementation in connection with the cookie to be utilized between entities.

Figure 2:
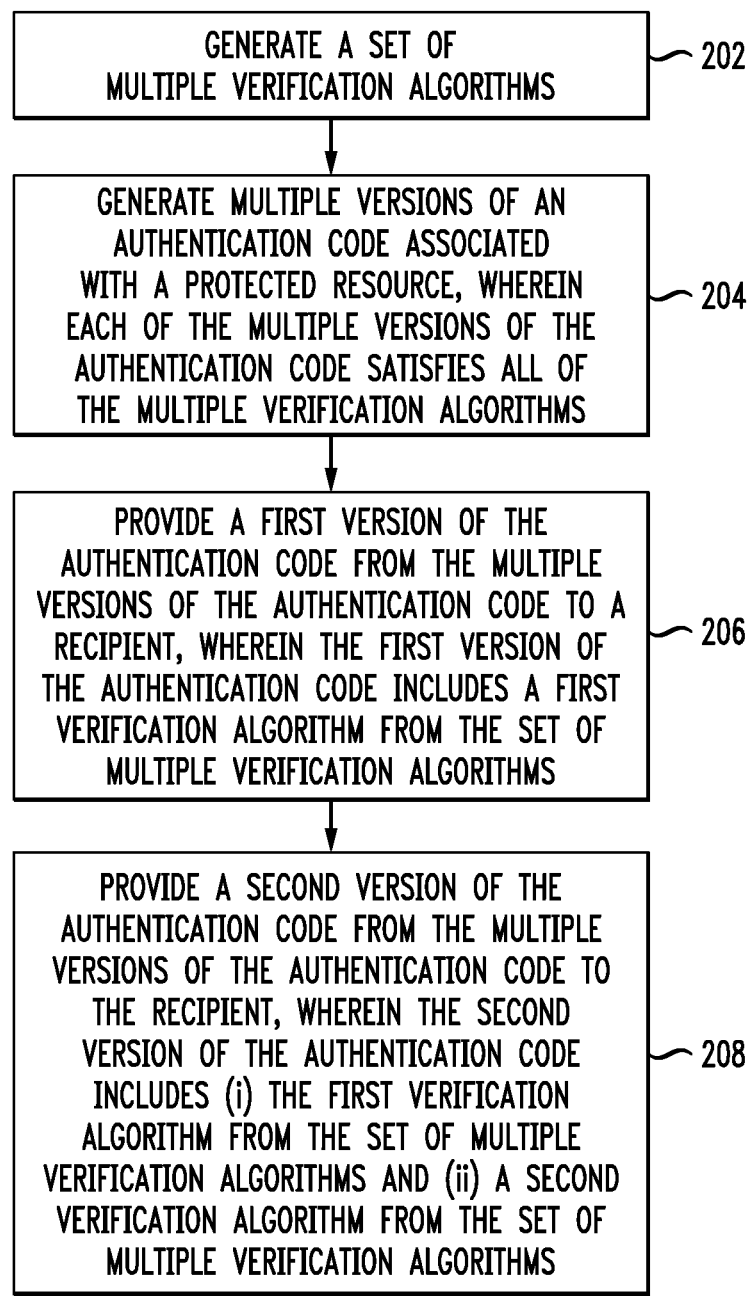
FIG. 2 is a flow diagram illustrating techniques according to an embodiment of the invention.

FIG. 2 is a flow diagram illustrating techniques according to an embodiment of the present invention. Step 202 includes generating a set of multiple verification algorithms. Step 204 includes generating multiple versions of an authentication code associated with a protected resource, wherein each of the multiple versions of the authentication code satisfies all of the multiple verification algorithms.

Step 206 includes providing a first version of the authentication code from the multiple versions of the authentication code to a recipient, wherein the first version of the authentication code includes a first verification algorithm from the set of multiple verification algorithms. Step 208 includes providing a second version of the authentication code from the multiple versions of the authentication code to the recipient, wherein the second version of the authentication code includes (i) the first verification algorithm from the set of multiple verification algorithms and (ii) a second verification algorithm from the set of multiple verification algorithms.

In accordance with the techniques depicted in FIG. 2, satisfying (i) the first verification algorithm from the set of multiple verification algorithms and (ii) a second verification algorithm from the set of multiple verification algorithms in connection with the second version of the authentication code enables access to the protected resource, while satisfying only the first verification algorithm from the set of multiple verification algorithms in connection with the second version of the authentication code does not enable access to the protected resource.

The techniques depicted in FIG. 2 can additionally include providing an additional version of the authentication code from the multiple versions of the authentication code to the recipient, wherein the additional version of the authentication code includes (i) the first verification algorithm from the set of multiple verification algorithms, (ii) the second verification algorithm from the set of multiple verification algorithms, and (iii) an additional verification algorithm from the set of multiple verification algorithms. Such an embodiment of the invention can also include repeating the step of providing an additional version of the authentication code from the multiple versions of the authentication code to the recipient in accordance with a schedule. Further, such an embodiment of the invention can include repeating the step of providing an additional version of the authentication code from the multiple versions of the authentication code to the recipient in accordance with a release of an updated version of the protected resource.

As described herein, in at least one embodiment of the invention, the protected resource can include a hardware product, an inter-process communication module and/or a software product. In an embodiment wherein the protected resource includes a software product, the authentication code can include a software license code and the recipient can include a software licensee. Additionally, as noted herein, the techniques depicted in FIG. 2 can be carried out in at least one of an online environment and an offline environment.

Alternatively and/or in addition to the steps depicted in FIG. 2, at least one embodiment of the invention can include identifying an indication of attempted unauthorized access to the protected resource in connection with the first version of the authentication code, and providing, in response to the indication of attempted unauthorized access to the protected resource, a second version of the authentication code from the multiple versions of the authentication code to the recipient, wherein the second version of the authentication code includes (i) the first verification algorithm from the set of multiple verification algorithms and (ii) a second verification algorithm from the set of multiple verification algorithms.

Additionally, such an embodiment of the invention can further include providing, in response to an additional indication of attempted unauthorized access to the protected resource, an additional version of the authentication code from the multiple versions of the authentication code to the recipient, wherein the additional version of the authentication code includes (i) the first verification algorithm from the set of multiple verification algorithms, (ii) the second verification algorithm from the set of multiple verification algorithms, and (iii) an additional verification algorithm from the set of multiple verification algorithms. Also, such an embodiment can additionally include repeating the step of providing an additional version of the authentication code from the multiple versions of the authentication code to the recipient upon identifying each additional indication of attempted unauthorized access to the protected resource.

Aspects of the present invention are described herein with reference to flowchart illustrations and/or block diagrams of methods, apparatus (systems) and computer program products according to embodiments of the invention. It is to be appreciated that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As further described herein, such computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, as further detailed below, at least one embodiment of the invention includes an article of manufacture tangibly embodying computer readable instructions which, when implemented, cause a computer to carry out techniques described herein.

The computer program instructions may also be loaded onto a computer or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should be noted that the functions noted in the block may occur out of the order noted in the figures.

Accordingly, the techniques described herein can include providing a system, wherein the system includes distinct software modules, each being embodied on a tangible computer-readable recordable storage medium (for example, all modules embodied on the same medium, or each modules embodied on a different medium). The modules can run, for example, on a hardware processor, and the techniques detailed herein can be carried out using the distinct software modules of the system executing on a hardware processor.

Additionally, the techniques detailed herein can also be implemented via a computer program product that includes computer useable program code stored in a computer readable storage medium in a data processing system, wherein the computer useable program code was downloaded over a network from a remote data processing system. The computer program product can also include, for example, computer useable program code that is stored in a computer readable storage medium in a server data processing system, wherein the computer useable program code is downloaded over a network to a remote data processing system for use in a computer readable storage medium with the remote system.

As will be appreciated by one skilled in the art, aspects of the present invention may take the form of an entirely hardware embodiment, an entirely software embodiment (including firmware, resident software, micro-code, etc.) or an embodiment combining software and hardware aspects that may all generally be referred to herein as a "module" or "system."

An aspect of the invention or elements thereof can be implemented in the form of an apparatus including a memory and at least one processor that is coupled to the memory and operative to perform the techniques detailed herein. Also, as described herein, aspects of the present invention may take the form of a computer program product embodied in a computer readable medium having computer readable program code embodied thereon.

Figure 3:
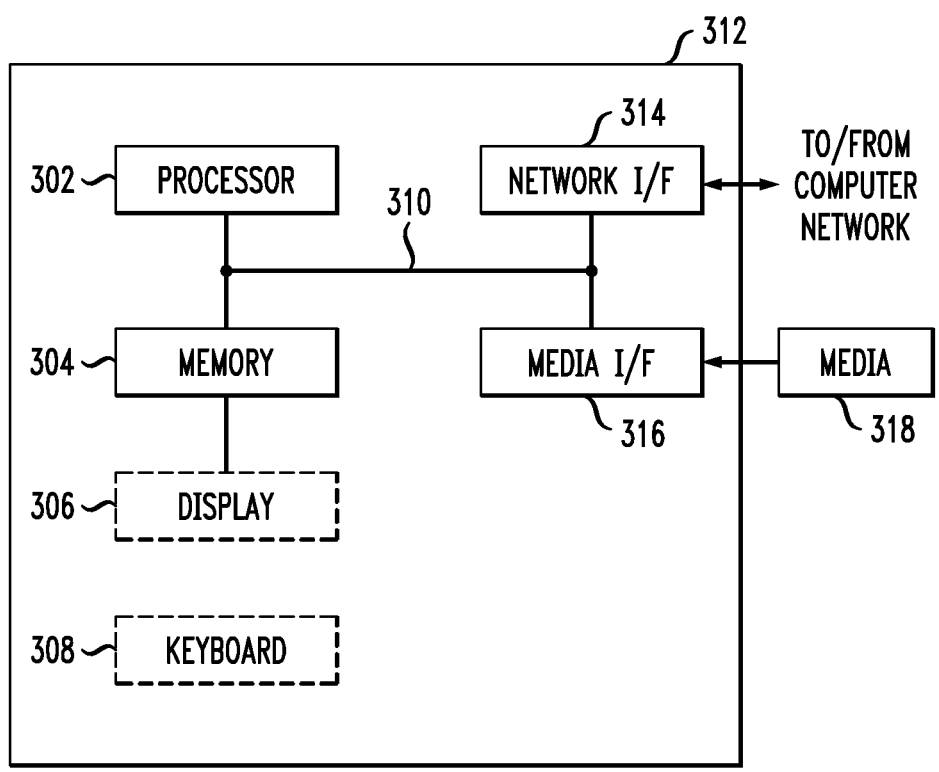
FIG. 3 is a system diagram of an exemplary computer system on which at least one embodiment of the invention can be implemented.

By way of example, an aspect of the present invention can make use of software running on a general purpose computer. As noted above, FIG. 3 is a system diagram of an exemplary computer system on which at least one embodiment of the invention can be implemented. As depicted in FIG. 3, an example implementation employs, for example, a processor 302, a memory 304, and an input/output interface formed, for example, by a display 306 and a keyboard 308. The term "processor" as used herein includes any processing device(s), such as, for example, one that includes a central processing unit (CPU) and/or other forms of processing circuitry. The term "memory" includes memory associated with a processor or CPU, such as, for example, random access memory (RAM), read only memory (ROM), a fixed memory device (for example, a hard drive), a removable memory device (for example, a diskette), a flash memory, etc. Further, the phrase "input/output interface," as used herein, includes a mechanism for inputting data to the processing unit (for example, a mouse) and a mechanism for providing results associated with the processing unit (for example, a printer).

The processor 302, memory 304, and input/output interface such as display 306 and keyboard 308 can be interconnected, for example, via bus 310 as part of a data processing unit 312. Suitable interconnections via bus 310, can also be provided to a network interface 314 (such as a network card), which can be provided to interface with a computer network, and to a media interface 316 (such as a diskette or compact disc read-only memory (CD-ROM) drive), which can be provided to interface with media 318.

Accordingly, computer software including instructions or code for carrying out the techniques detailed herein can be stored in associated memory devices (for example, ROM, fixed or removable memory) and, when ready to be utilized, loaded in part or in whole (for example, into RAM) and implemented by a CPU. Such software can include firmware, resident software, microcode, etc.

As noted above, a data processing system suitable for storing and/or executing program code includes at least one processor 302 coupled directly or indirectly to memory elements 304 through a system bus 310. The memory elements can include local memory employed during actual implementation of the program code, bulk storage, and cache memories which provide temporary storage of at least some program code in order to reduce the number of times code must be retrieved from bulk storage during implementation. Also, input/output (I/O) devices such as keyboards 308, displays 306, and pointing devices, can be coupled to the system either directly (such as via bus 310) or through intervening I/O controllers.

Network adapters such as network interface 314 (for example, a modem, a cable modem or an Ethernet card) can also be coupled to the system to enable the data processing system to become coupled to other data processing systems or remote printers or storage devices through intervening private or public networks.

As used herein, a "server" includes a physical data processing system (such as system 312 as depicted in FIG. 3) running a server program. It will be understood that such a physical server may or may not include a display and keyboard.

As noted, at least one embodiment of the invention can take the form of a computer program product embodied in a computer readable medium having computer readable program code embodied thereon. As will be appreciated, any combination of computer readable media may be utilized. The computer readable medium can include a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. Examples include an electrical connection having one or more wires, a portable computer diskette, a hard disk, RAM, ROM, an erasable programmable read-only memory (EPROM), flash memory, an optical fiber, a portable CD-ROM, an optical storage device, a magnetic storage device, and/or any suitable combination of the foregoing. More generally, a computer readable storage medium may be any tangible medium that can contain, or store a program for use by or in connection with an instruction execution system, apparatus, or device.

Additionally, a computer readable signal medium may include a propagated data signal with computer readable program code embodied therein, for example, in baseband or as part of a carrier wave. Such a propagated signal may take any of a variety of forms such as, for example, electro-magnetic, optical, or a suitable combination thereof. More generally, a computer readable signal medium may be any computer readable medium that is not a computer readable storage medium and that can communicate, propagate, or transport a program for use by or in connection with an instruction execution system, apparatus, or device.

Program code embodied on a computer readable medium can be transmitted using an appropriate medium such as, for example, wireless, wireline, optical fiber cable, radio frequency (RF), and/or a suitable combination of the foregoing. Computer program code for carrying out operations in accordance with one or more embodiments of the invention can be written in any combination of at least one programming language, including an object oriented programming language, and conventional procedural programming languages. The program code may execute entirely on a user's computer, partly on a user's computer, as a stand-alone software package, partly on a users computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider (ISP)).

In light of the above descriptions, it should be understood that the components illustrated herein can be implemented in various forms of hardware, software, or combinations thereof, for example, application specific integrated circuit(s) (ASICS), functional circuitry, an appropriately programmed general purpose digital computer with associated memory, etc.

Terminology used herein is for the purpose of describing particular embodiments only and is not intended to be limiting of the invention. For example, the singular forms "a," "an" and "the" are intended to include the plural forms as well, unless clearly indicated otherwise. It will be further understood that the terms "comprises" and/or "comprising," as used herein, specify the presence of stated features, integers, steps, operations, elements, and/or components, but do not preclude the presence or addition of another feature, integer, step, operation, element, component, and/or group thereof. Additionally, the corresponding structures, materials, acts, and equivalents of all means or step plus function elements in the claims are intended to include any structure, material, or act for performing the function in combination with other claimed elements as specifically claimed.

Also, it should again be emphasized that the above-described embodiments of the invention are presented for purposes of illustration only. Many variations and other alternative embodiments may be used. For example, the techniques are applicable to a wide variety of other types of communication systems and cryptographic devices that can benefit from illegitimate license code generator detection techniques. Accordingly, the particular illustrative configurations of system and device elements detailed herein can be varied in other embodiments. These and numerous other alternative embodiments within the scope of the appended claims will be readily apparent to those skilled in the art.

What is claimed is:

1. A method comprising:
    generating a set of multiple verification algorithms;
    generating multiple versions of an authentication code associated with a protected resource, wherein each of the multiple versions of the authentication code satisfies all of the multiple verification algorithms;
    providing a first version of the authentication code from the multiple versions of the authentication code to a recipient, wherein the first version of the authentication code includes a first verification algorithm from the set of multiple verification algorithms; and
    providing a second version of the authentication code from the multiple versions of the authentication code to the recipient, wherein the second version of the authentication code includes (i) the first verification algorithm from the set of multiple verification algorithms and (ii) a second verification algorithm from the set of multiple verification algorithms;
    wherein said generating and said providing are carried out by a computing device.

2. The method of claim 1, further comprising:
    providing an additional version of the authentication code from the multiple versions of the authentication code to the recipient, wherein the additional version of the authentication code includes (i) the first verification algorithm from the set of multiple verification algorithms, (ii) the second verification algorithm from the set of multiple verification algorithms, and (iii) an additional verification algorithm from the set of multiple verification algorithms.

3. The method of claim 2, further comprising:
    repeating said providing an additional version of the authentication code from the multiple versions of the authentication code to the recipient in accordance with a schedule.

4. The method of claim 2, further comprising:
    repeating said providing an additional version of the authentication code from the multiple versions of the authentication code to the recipient in accordance with a release of an updated version of the protected resource.

5. The method of claim 1, wherein satisfying (i) the first verification algorithm from the set of multiple verification algorithms and (ii) a second verification algorithm from the set of multiple verification algorithms in connection with the second version of the authentication code enables access to the protected resource, while satisfying only the first verification algorithm from the set of multiple verification algorithms in connection with the second version of the authentication code does not enable access to the protected resource.

6. The method of claim 1, wherein said protected resource comprises a software product.

7. The method of claim 6, wherein said authentication code comprises a software license code.

8. The method of claim 6, wherein said recipient comprises a software licensee.

9. The method of claim 1, wherein said protected resource comprises a hardware product.

10. The method of claim 1, wherein said protected resource comprises an inter-process communication module.

11. The method of claim 1, wherein said generating steps and said providing steps are carried out in at least one of an online environment and an offline environment.

12. An article of manufacture comprising a non-transitory processor-readable storage medium having processor-readable instructions tangibly embodied thereon which, when implemented, cause a processor to carry out the steps of the method of claim 1.

13. An apparatus comprising:
    a memory; and
    at least one processor coupled to the memory; and
    a plurality of modules executing on the at least one processor, wherein the plurality of modules comprise:
        a first code generator module configured to generate a set of multiple verification algorithms;
        a second code generator module configured to generate multiple versions of an authentication code associated with a protected resource, wherein each of the multiple versions of the authentication code satisfies all of the multiple verification algorithms; and
        a first processor module configured to provide a first version of the authentication code from the multiple versions of the authentication code to a recipient, wherein the first version of the authentication code includes a first verification algorithm from the set of multiple verification algorithms; and
        a second processor module configured to provide a second version of the authentication code from the multiple versions of the authentication code to the recipient, wherein the second version of the authentication code includes (i) the first verification algorithm from the set of multiple verification algorithms and (ii) a second verification algorithm from the set of multiple verification algorithms.

14. A method comprising:

generating a set of multiple verification algorithms;

generating multiple versions of an authentication code associated with a protected resource, wherein each of the multiple versions of the authentication code satisfies all of the multiple verification algorithms;

providing a first version of the authentication code from the multiple versions of the authentication code to a recipient, wherein the first version of the authentication code includes a first verification algorithm from the set of multiple verification algorithms;

identifying an indication of attempted unauthorized access to the protected resource in connection with the first version of the authentication code; and providing, in response to the indication of attempted unauthorized access to the protected resource, a second version of the authentication code from the multiple versions of the authentication code to the recipient, wherein the second version of the authentication code includes (i) the first verification algorithm from the set of multiple verification algorithms and (ii) a second verification algorithm from the set of multiple verification algorithms;

wherein said generating, said identifying, and said providing are carried out by a computing device.

15. The method of claim 14, further comprising:

providing, in response to an additional indication of attempted unauthorized access to the protected resource, an additional version of the authentication code from the multiple versions of the authentication code to the recipient, wherein the additional version of the authentication code includes (i) the first verification algorithm from the set of multiple verification algorithms, (ii) the second verification algorithm from the set of multiple verification algorithms, and (iii) an additional verification algorithm from the set of multiple verification algorithms.

16. The method of claim 15, further comprising:

repeating said providing an additional version of the authentication code from the multiple versions of the authentication code to the recipient upon identifying each additional indication of attempted unauthorized access to the protected resource.

17. The method of claim 14, wherein satisfying (i) the first verification algorithm from the set of multiple verification algorithms and (ii) a second verification algorithm from the set of multiple verification algorithms in connection with the second version of the authentication code enables access to the protected resource, while satisfying only the first verification algorithm from the set of multiple verification algorithms in connection with the second version of the authentication code does not enable access to the protected resource.

18. The method of claim 14, wherein said protected resource comprises a software product.

19. The method of claim 14, wherein said protected resource comprises a hardware product.

20. The method of claim 14, wherein said generating steps, said identifying step, and said providing steps are carried out in at least one of an online environment and an offline environment.

* * * * *